United States Patent [19]
Hartung et al.

[11] Patent Number: 5,826,225
[45] Date of Patent: Oct. 20, 1998

[54] METHOD AND APPARATUS FOR IMPROVING VECTOR QUANTIZATION PERFORMANCE

[75] Inventors: John Hartung, Warren; Jonathan David Rosenberg, Morganville, both of N.J.

[73] Assignee: Lucent Technologies Inc., Murray Hill, N.J.

[21] Appl. No.: 718,110

[22] Filed: Sep. 18, 1996

[51] Int. Cl.⁶ .................................................. G10L 7/02
[52] U.S. Cl. ..................... 704/222; 704/230; 704/503; 704/504; 704/500
[58] Field of Search ................................... 704/222, 230, 704/503, 504, 500

[56] References Cited

U.S. PATENT DOCUMENTS

| | | | |
|---|---|---|---|
| 4,821,119 | 4/1989 | Gharavi | 358/136 |
| 4,972,483 | 11/1990 | Carey | 381/31 |
| 5,136,663 | 8/1992 | Nishio | 381/36 |
| 5,200,820 | 4/1993 | Gharavi | 356/105 |
| 5,247,579 | 9/1993 | Hardwick | 381/36 |
| 5,253,058 | 10/1993 | Gharavi | 358/136 |

*Primary Examiner*—David R. Hudspeth
*Assistant Examiner*—Daniel Abebe

[57] ABSTRACT

A method and apparatus for providing high-speed data compressing without sacrificing the quality of data reconstruction. Each input vector or block of original data is expressed as a combination of a codebook index and an error differential, or as a compressed version of the original block of data, depending on whether the total number of bits needed to express the input vector as a combination of a codebook index and an error differential is less than the total bits needed to send the compressed version of the original block of data. In one embodiment, the flexibility to express video data in a compressed format or as a combination of a codebook index plus an error differential is provided through a video system employing a codebook, a scalar quantizer, and an entropy coder.

20 Claims, 2 Drawing Sheets

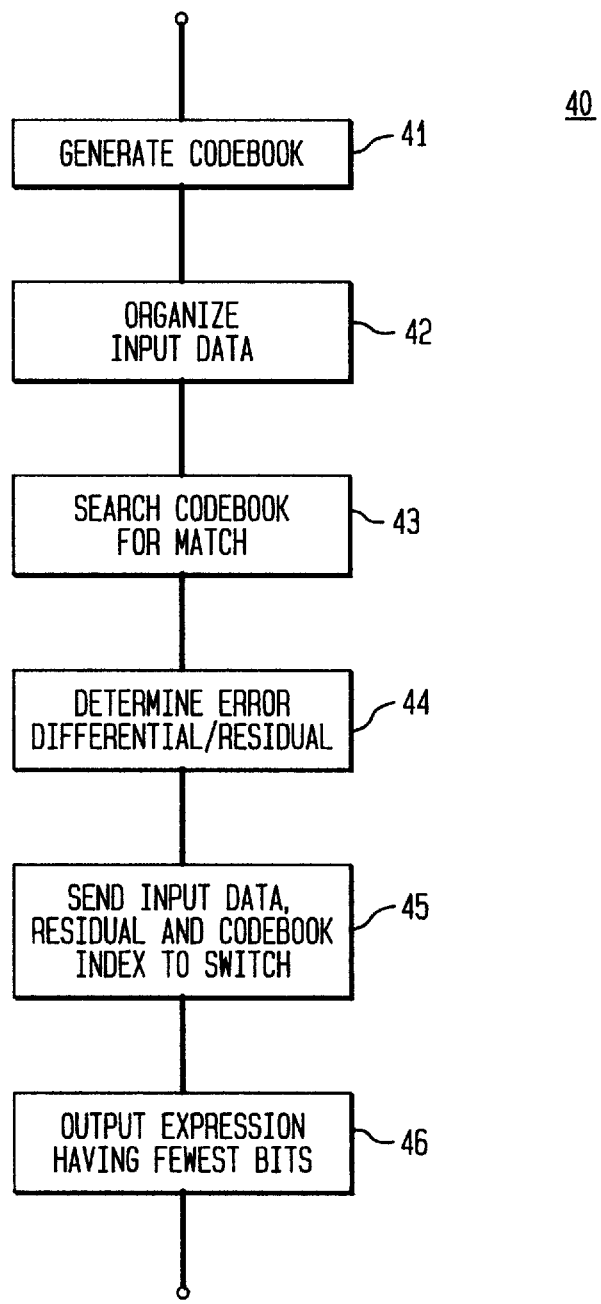

METHOD AND APPARATUS FOR IMPROVING VECTOR QUANTIZATION PERFORMANCE

FIELD OF THE INVENTION

This invention relates to video coders, and more particularly to codebook-based video coders.

BACKGROUND OF THE INVENTION

Present day video systems utilize many different video compression techniques when communicating video data. These techniques include the use of video codebooks, entropy coders and quantizers.

A quantizer is a device which replaces a signal that can represent a large number of values with a signal that can represent a smaller number of values. There are two basic types of quantizers used in transmitting data between a source unit and a destination unit; scalar quantizers, and vector quantizers. Scalar quantizers operate on signals having a single degree of freedom. One type of a scalar quantizer is an analog-to-digital converter. An analog to digital converter takes a continuously varying or analog signal, which has a voltage that can take one of many different values, and converts that signal to a digital signal having only a limited number of values. For example, a four bit analog to digital converter can represent the value of an analog signal by a digital signal that can only have one of sixteen different values.

Vector quantizers, on the other hand, operate on signals having multiple degrees of freedom. One type of vector quantizer is a video codec that provides video image compression. It can be said that a vector quantizer essentially divides an image into numerous small elements called pixels. For example, an image of a car may be divided into a 600 by 600 pixel grid, wherein each pixel is essentially a dot in the image of the car. A group of these pixels can be said to form a vector or subimage of the car image. That is, each N×N patch of pixels from the image is said to form an image vector. Thus, an image can be represented by a group of image vectors, wherein the number of image vectors needed to represent the entire image depends on the size of each image vector.

A codebook is a memory that stores a given set of vectors that represent the most commonly found vectors in an image. For example, a codebook may contain a vector laving an N×N patch of black pixels, an N×N patch of white pixels, and/or N×N patch of pixels, wherein half the pixels are white and half are black. Each codebook vector is assigned a unique identification code or address in the memory where it resides. For example, the solid white N×N patch of pixels or codebook vector may be assigned an ID code or address #01, whereas the solid black codebook vector may be assigned an ID code or address #2. The key is that the video compression system has a codebook with a sufficient variety of vectors so that at least one codebook vector closely matches each of the many vectors that might be found in the image.

As a result, when quantizing a full image, a vector quantizer divides the full image into a series of image vectors. For each image vector, the vector quantizer identifies one closely-matching codebook vector, and generates a new signal made up of the identification code or address of the closest-matching codebook vector found in the codebook for each image vector.

Entropy coding is a technique of lossless data compression which takes advantage of the statistical characteristics of a data source to achieve compact data representation. As a result, an entropy coder employs a method of reducing the information bits that need to be transmitted by taking advantage of some characteristic of the data source and/or the data coming from that source. For example, if a source frequently sends the same image vector, entropy coding (also known as variable length coding (VLC)) translates the input data, often in fixed-length format, into codes of variable lengths. The basic concept behind VLC is to represent more frequent data by shorter codes and less frequent data by longer codes, thus making the average code length shorter than a fixed-length representation.

Run length coding is another technique for representing video data. It is useful for representing a sequence of values where many of the values are zero, with non-zero values dispersed among them. In run-length coding, the sequence is transmitted by sending pairs of numbers. The first represents the number of consecutive zero's before a non-zero value, and the second represents the nonzero value. For example, consider the sequence 0000300000002001. Such a sequence could be transmitted by sending the pairs (4,3), (6,2), (2,1). Such sequences occur when the image vectors are scalar quantized, and many components are subsequently represented by 0. Many video coders employ both run length coding and entropy coding, by applying variable length (entropy) coding to the pairs generated from the run-length coder.

In present day video systems which utilize a codebook to compress the video data, the system sends either the codebook index (i.e. codebook address of the image vector that most closely matches the actual block of video) or a scalar quantized version of the actual block of video, depending on which requires fewer bits. As a result, regeneration of the full image at the decoder can be accomplished by a device which has a copy of the codebook used at the encoder. Such a device regenerates the image by replacing each codebook address with its corresponding codebook vector. Since the codebook entries do not precisely match the original image vectors, however, the regenerated image differs from the original image by some residual value or distortion.

It is known by those skilled in the art that the overall system distortion can be reduced by increasing the number of codebook entries. It is also known, however, that increasing the number of codebook entries will increase the number of computation steps necessary to match a codebook vector with the actual video data block being sent. It is also known that increasing the number of entries increases the number of bits required to address the codebook, thus increasing the rate. As a result, present day systems are limited in the size of the codebook that can be used to compress video data, thus forcing video system designers to sacrifice image quality for speed.

SUMMARY OF THE INVENTION

Accordingly, the present invention is directed to a high-speed method and apparatus for compressing data without sacrificing the quality of data reconstruction. To attain this, the present invention expresses each input vector or block of original data as a combination of a codebook index and an error differential, or as a compressed version of the original block of data, depending on which requires fewer bits.

In one embodiment, a set of codebook vectors are generated and stored in a codebook, wherein the codebook vectors are retrievable and identifiable through a unique identification code. The original data is organized as a set of input vectors. For each input vector; a codebook vector that closely matches the input vector is selected, and an error differential or distance between the selected closely matching codebook vector and the input vector is computed. Thereafter, each input vector is expressed as either a combination of the identification code of the closely matching codebook vector and the computed error differential, or as a compressed version of the original data, depending on the number of bits necessary to express each.

In another embodiment, the flexibility to express video data in a compressed format or as a combination of a codebook index plus an error differential between the original data and the matching codebook vector, is provided through a video system employing a codebook, a scalar quantizer, and an entropy coder. In any embodiment, the apparatus and method of the present invention provides a flexible means to compress data such that increased compression rates can be achieved in present day systems without sacrificing quality. Thus, the present invention overcomes to a large extent the limitations of the prior art.

In various embodiments, the input vectors which are compressed in accordance with the present invention may alternatively comprise blocks of the original image data or blocks of data which have been pre-processed in various ways. For example, the input vectors may comprise blocks which have been transformed out of the spatial domain into, e.g., a frequency domain, having been generated with use of a conventional transform such as the well-known Discrete Cosine Transformation (DCT). Moreover, where the input signal comprises a video signal, the input vectors may comprise "inter-coded" block data (i.e. data representing the difference between a current image block of data and a corresponding previous image block of data), which may or may not have been "motion-compensated" by conventional motion prediction techniques, as opposed to "intra-coded" block data (i.e. data representing the current image block only). Note that each of these techniques is familiar to those skilled in the art.

These and other features of the invention are described in more detail in the following detailed description of the embodiments of the invention when taken with the drawings. The scope of the invention, however, is limited only by the claims appended hereto.

BRIEF DESCRIPTION OF THE DRAWINGS

FIG. 2 is a flow diagram of one embodiment of a method for providing the dynamic optimizing of data compression according to the present invention.

DETAILED DESCRIPTION OF ILLUSTRATIVE EMBODIMENTS OF THE INVENTION

Figure 1:
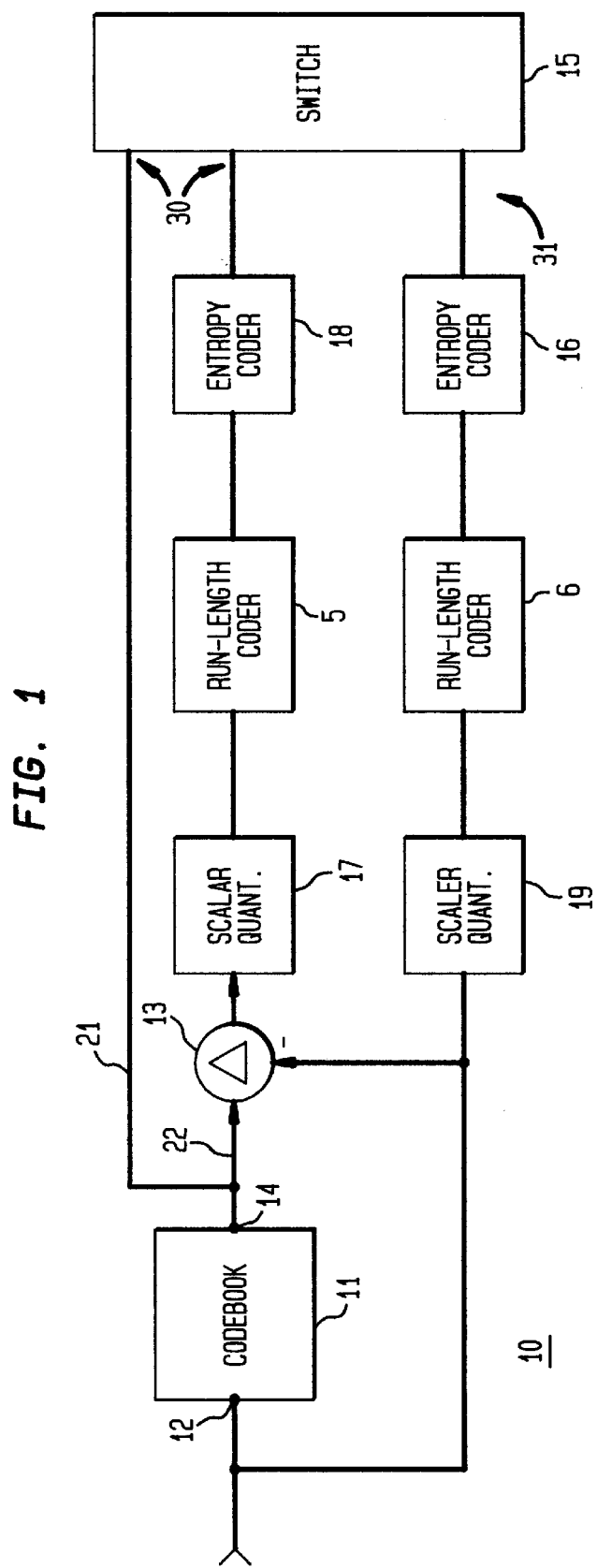
FIG. 1 is an illustrative embodiment of a flexible data compressor, providing increased compression without substantially sacrificing system quality, according to the present invention.

Referring now to FIG. 1, there is shown one embodiment of a flexible data compressor according to the present invention, hereinafter referred to as compressor 10. As shown, compressor 10 has a codebook 11 with an input 12 coupled to scalar quantizer 19 and adder 13, and an output 14 coupled to adder 13 and switch 15. Scalar quantizer 19 is coupled to run-length coder 6 which, in turn, is coupled to entropy coder 16. Adder 13 is coupled to scalar quantizer 17 which, in turn is coupled to run-length coder 5. Run-length coder 5 is coupled to entropy coder 18. Entropy coders 16 and 18 are coupled to switch 15. As described above, codebook 11 has a given set of codebook vectors, each of which is stored at a unique address or index with the codebook.

In operation, compressor 10 expresses a given block of original data or input vector in one of two forms, depending on the path of the input vector through compressor 10. That is, depending on whether the input data is expressed through path 30 or 31, as shown in FIG. 1, the input vector will take-on one of two compressed forms: (1) a compressed version of the input vector, or (2) a combination of a codebook index and a residual or error differential vector.

In traveling through path 30, the input vector is input to codebook 11 through input port 12. A data vector which closely matches the input vector is identified in codebook 11, and the identified closely matching data vector along with its unique codebook address is retrieved. The retrieved codebook address is output through line 21 to switch 15 and the corresponding matching codebook vector is output to adder 13 through line 22. The original data vector is also routed around codebook 11 to adder 13 wherein a difference between the original data vector and the matching data vector is computed to determine an error differential vector. The error differential vector or residual is output from adder 13 to scalar quantizer 17, which outputs the quantized residual to run-length coder 5 which, in turn, outputs the compressed coded residual to entropy coder 18. Entropy coder 18, in turn, outputs the compressed coded residual to switch 15. As a result, path 30 provides a compressed coded residual and the codebook index to switch 15 for expression to a destination (not shown).

In traveling through path 31, the input vector is transmitted to scalar quantizer 19, run-length coder 6 and entropy coder 16 which outputs a compressed coded version of the input vector to switch 15. Switch 15, in turn is operable to make a choice to express the input vector as a combination of the compressed coded residual and codebook index, described above, or as the compressed coded version of the input vector, as described above. In one embodiment, the choice may depend on the number of bits required to send the combination of coded residual and codebook index, as compared to the number of bits required to send just the compressed version of the input vector as provided through path 31. As a result, compressor 10 provides a flexible means for dynamically optimizing compression speed and efficiency without compromising data quality.

Referring now to FIG. 2, there is shown one embodiment of a method for providing the dynamic optimizing of data compression according to the present invention, hereinafter referred to as data compression method 40. As shown, data compression method 40 generates a set of codebook vectors, step 41, wherein each codebook vector is identified by a unique identification code. Then, at step 42, the original data or input data is organized as set of input vectors. The input vectors are then searched in a codebook, step 43, for a closely matching codebook vector. Then, at step 44, the matching codebook vector is subtracted from the input vector to determine an error differential vector or residual vector between the two. The residual vector, the unique identification code identified for the matching codebook vector, and the input vector are all sent to a switch, at step 45.

The switch, at step 46, then outputs either a combination of the unique identification code and the residual vector, or a compressed version of the input vector, depending on the number of bits required to send each. More specifically, the switch outputs the input vector as a compressed version of the input vector when it is more efficient, i.e. requires less bits, than expressing the input vector as a combination of the identification index and the residual vector. Thus, providing a means for optimizing compression efficiency without sacrificing system quality.

In another embodiment, the apparatus and method of the present invention provide flexible data compression for video data in a video communication system. The above description, however, includes exemplary embodiments and methods of implementing the present invention. References to specific examples and embodiments in the description should not be construed to limit the present invention in any manner, and is merely provided for the purpose of describing the general principles of the present invention. It will be apparent to one of ordinary skill in the art that the present invention may be practiced through other embodiments.

What is claimed is:

1. A method for coding a signal comprising a set of input vectors with use of a set of codebook vectors, each codebook vector identified by a unique identification code, the method comprising the steps of:
   a. selecting a codebook vector from said set of codebook vectors which closely matches a given one of said input vectors;
   b. computing a difference between said given input vector and said selected, closely matching codebook vector;
   c. determining a first number of bits in which said given input vector may be coded as a signal representing a combination of the unique identification code of said selected, closely matching codebook vector and said difference between said given input vector and said closely matching codebook vector;
   d. determining a second number of bits in which said given input vector may be coded without the use of said set of codebook vectors;
   e. coding said given input vector as said signal representing a combination of the unique identification code of said selected, closely matching codebook vector and said difference between said given input vector and said closely matching codebook vector, when said first number of bits does not exceed said second number of bits; and
   f. coding said input vector without the use of said set of codebook vectors when said first number of bits exceeds said second number of bits, said coding of said input vector producing a coded input vector.

2. The method of claim 1 wherein the signal is a video signal.

3. The method of claim 2 wherein each said input vector is an 8×8 data vector.

4. The method of claim 3 wherein each said codebook vector is an 8×8 data vector.

5. The method of claim 4 wherein each said unique identification code is an 8 bit code.

6. The method of claim 5 wherein said codebook vectors are stored in a codebook.

7. The method of claim 6 wherein said difference between said given input vector and said selected, closely matching codebook vector is a given error differential vector.

8. The method of claim 1, wherein said coding in step e, includes the steps of scalar quantizing, run-length coding and entropy coding said difference between said given input vector and said selected, closely matching codebook vector.

9. The method of claim 1, wherein said coding in step f, includes the steps of scalar quantizing, run-length coding and entropy coding each said coded input vector.

10. The method of claim 1 wherein steps d and e are performed through a switch.

11. A coder for coding a signal comprising a set of input vectors, comprising:
    a codebook comprising a set of codebook vectors, each codebook vector identified by a unique identification code;
    a processor for selecting a codebook vector from said set of codebook vectors which closely matches a given one of said input vectors;
    a subtractor for computing a difference between said given input vector and said selected, closely matching codebook vector;
    means for determining a first number of bits in which said given input vector may be coded as a signal representing a combination of the unique identification code of said selected, closely matching codebook vector and said difference between said given input vector and said closely matching codebook vector;
    means for determining a second number of bits in which said given input vector may be coded without the use of said set of codebook vectors;
    means for coding said given input vector as said signal representing a combination of the unique identification code of said selected, closely matching codebook vector and said difference between said given input vector and said closely matching codebook vector, when said first number of bits does not exceed said second number of bits; and
    means for coding said given input vector without the use of said set of codebook vectors when said first number of bits exceeds said second number of bits.

12. The coder of claim 11 wherein the signal is a video signal.

13. The coder of claim 12 wherein each said input vector is an 8×8 data vector.

14. The coder of claim 13 wherein each said codebook vector is an 8×8 data vector.

15. The coder of claim 14 wherein each said unique identification code is an 8 bit code.

16. The apparatus of claim 15 wherein said difference between said given input vector and said selected, closely matching codebook vector is a given error differential vector.

17. The apparatus of claim 11 further comprising a first scalar quantizer, a run-length coder and a first entropy coder for compressing each said computed difference between said given input vector and said selected, closely matching codebook vector.

18. The apparatus of claim 11 further comprising a second scalar quantizer, a run-length coder and a second entropy coder for compressing said input vector.

19. The apparatus of claim 11 further comprising an adder for computing said difference between said given input vector and said selected, closely matching codebook vector.

20. In a video system for coding video data, comprising:
    a codebook having a set of codebook vectors, each codebook vector identified by a unique identification code;
    a processor for organizing the video data as a set of input vectors, and for selecting a codebook vector from said set of codebook vectors which closely matches a given one of said input vector,
    a subtractor for computing a difference between said given input vector and said selected, closely matching codebook vector;
    means for determining a first number of bits in which said given input vector may be coded as a signal representing a combination of the unique identification code of said selected, closely matching codebook vector and said difference between said given input vector and said closely matching codebook vector;

means for determining a second number of bits in which said given input vector may be coded without the use of said set of codebook vectors;

means for coding said given input vector as said signal representing a combination of the unique identification code of said selected, closely matching codebook vector and said difference between said given input vector and said closely matching codebook vector, when said first number of bits does not exceed said second number of bits; and means for scalar quantizing and coding said given input vector without the use of said set of codebook vectors when said first number of bits exceeds said second number of bits.

\* \* \* \* \*